(12) United States Patent
Kasaba et al.

(10) Patent No.: US 8,373,401 B2
(45) Date of Patent: Feb. 12, 2013

(54) STEP-UP/STEP-DOWN DC-DC CONVERTER AND VEHICLE LIGHTING APPLIANCE

(75) Inventors: Yusuke Kasaba, Shizuoka (JP); Masayasu Ito, Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 183 days.

(21) Appl. No.: 13/024,419

(22) Filed: Feb. 10, 2011

(65) Prior Publication Data

US 2011/0198998 A1   Aug. 18, 2011

(30) Foreign Application Priority Data

Feb. 16, 2010   (JP) ................... 2010-031627

(51) Int. Cl.
*G05F 1/00*   (2006.01)

(52) U.S. Cl. .................. 323/282; 307/10.8; 315/209 R; 315/308

(58) Field of Classification Search .............. 315/77, 315/80, 82, 209 R, 225, 291, 307, 308; 323/265, 323/282, 284; 307/10.1, 10.8
See application file for complete search history.

(56) References Cited

U.S. PATENT DOCUMENTS

| | | | | |
|---|---|---|---|---|
| 4,618,812 A | * | 10/1986 | Kawakami | 323/224 |
| 4,967,138 A | * | 10/1990 | Obergfell et al. | 323/224 |
| 6,087,816 A | * | 7/2000 | Volk | 323/282 |
| 6,166,527 A | | 12/2000 | Dwelley et al. | |
| 7,466,112 B2 | * | 12/2008 | Zhou et al. | 323/259 |

FOREIGN PATENT DOCUMENTS

JP   62-18970   1/1987

* cited by examiner

*Primary Examiner* — Thuy Vinh Tran
(74) *Attorney, Agent, or Firm* — Fish & Richardson P.C.

(57) ABSTRACT

A step-up/step-down DC-DC converter includes a control section to compare an output value from voltage decrease or increase sections and a preset target value. A computation circuit provides a voltage value resulting from subtracting a difference between the voltage value of the comparison result and a first preset voltage value from a first voltage value. A drive pulse generation section generates a drive pulse for turning on and off a voltage decrease switch and a voltage increase switch in response to the result of a comparison between the computation output voltage and a ramp wave. When the voltage value of the computation output voltage exists between the first voltage value and the second voltage value, the drive pulse generation section provides control to selectively switch the on and off operation of the voltage decrease switch and the on and off operation of the voltage increase switch.

5 Claims, 9 Drawing Sheets

STEP-UP/STEP-DOWN DC-DC CONVERTER AND VEHICLE LIGHTING APPLIANCE

CROSS-REFERENCE TO RELATED APPLICATION

This application claims the benefit of priority of Japanese Application No. 2010-031627, filed on Feb. 16, 2010, the disclosure of which is incorporated herein by reference.

TECHNICAL FIELD

This disclosure relates to a step-up/step-down DC-DC converter for increasing or decreasing an input DC voltage and converting the input/output DC voltage to a predetermined output voltage. The disclosure also relates to a vehicle lighting appliance including the step-up/step-down DC-DC converter.

BACKGROUND

Previously, as a DC-DC converter, for example, of an electronic device, a DC-DC converter of a chopper type that can hold output voltage in a constant range if input voltage fluctuates has been used.

As an example of this kind of DC-DC converter, the following has been proposed: A step-down copper transistor and a step-up chopper transistor are connected though a common choke coil. When the input voltage is higher than the output voltage, the step-up chopper transistor is turned off, and on/off control of the step-down chopper transistor is performed for decreasing the input voltage. When the input voltage is lower than the output voltage, the step-up chopper transistor is turned on, and on/off control of the step-down chopper transistor is performed for increasing the input voltage. (See, e.g., Japanese Laid-Open Patent No. 18970/1987.)

In this DC-DC converter, a DC-DC converter of the step-down chopper type and a DC-DC converter of the step-up chopper type are implemented as the same circuit.

In the example described above, the step-down chopper transistor and the step-up chopper transistor are selectively operated in response to the input voltage. However, when the voltage decrease and voltage increase are switched, the operation of the step-down chopper transistor and the operation of the step-up chopper transistor are not switched smoothly and thus it is difficult to hold the output voltage constant.

A delay occurs during switching in the transistors used as a step-down chopper transistor and a step-up chopper transistor. Therefore, when the step-down chopper transistor and the step-up chopper transistor are operated selectively in response to the input voltage at the switching time of the voltage decrease and voltage increase, the step-down chopper transistor may remain on and the step-up chopper transistor may maintain off. Thus, it is difficult to hold constant the output voltage relative to fluctuation of the input voltage during switching of a voltage decrease and voltage increase.

SUMMARY

Figure 1:
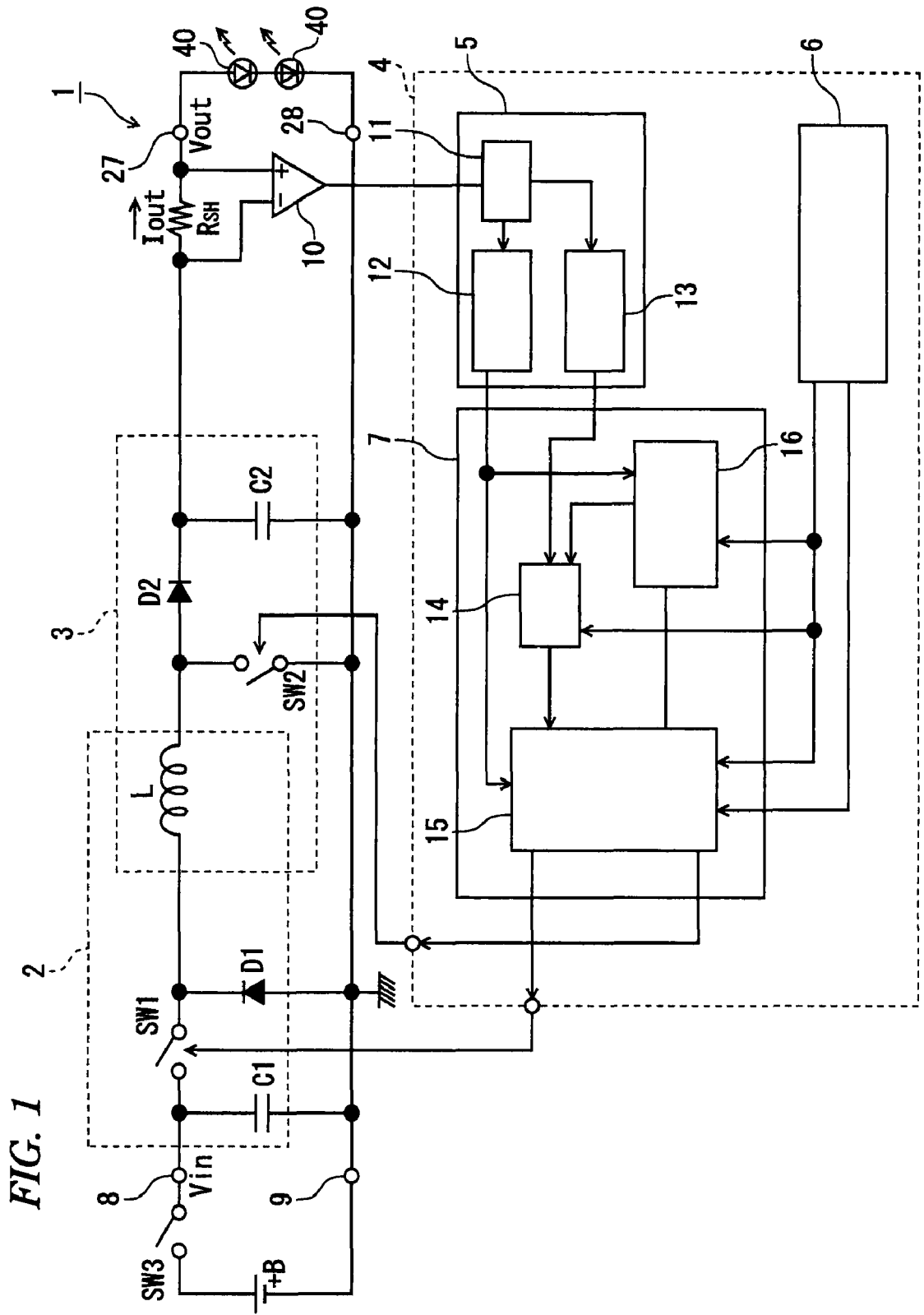
FIG. 1 illustrates a configuration of a step-up/step-down DC-DC converter according to an embodiment of the invention.
Figure 2:
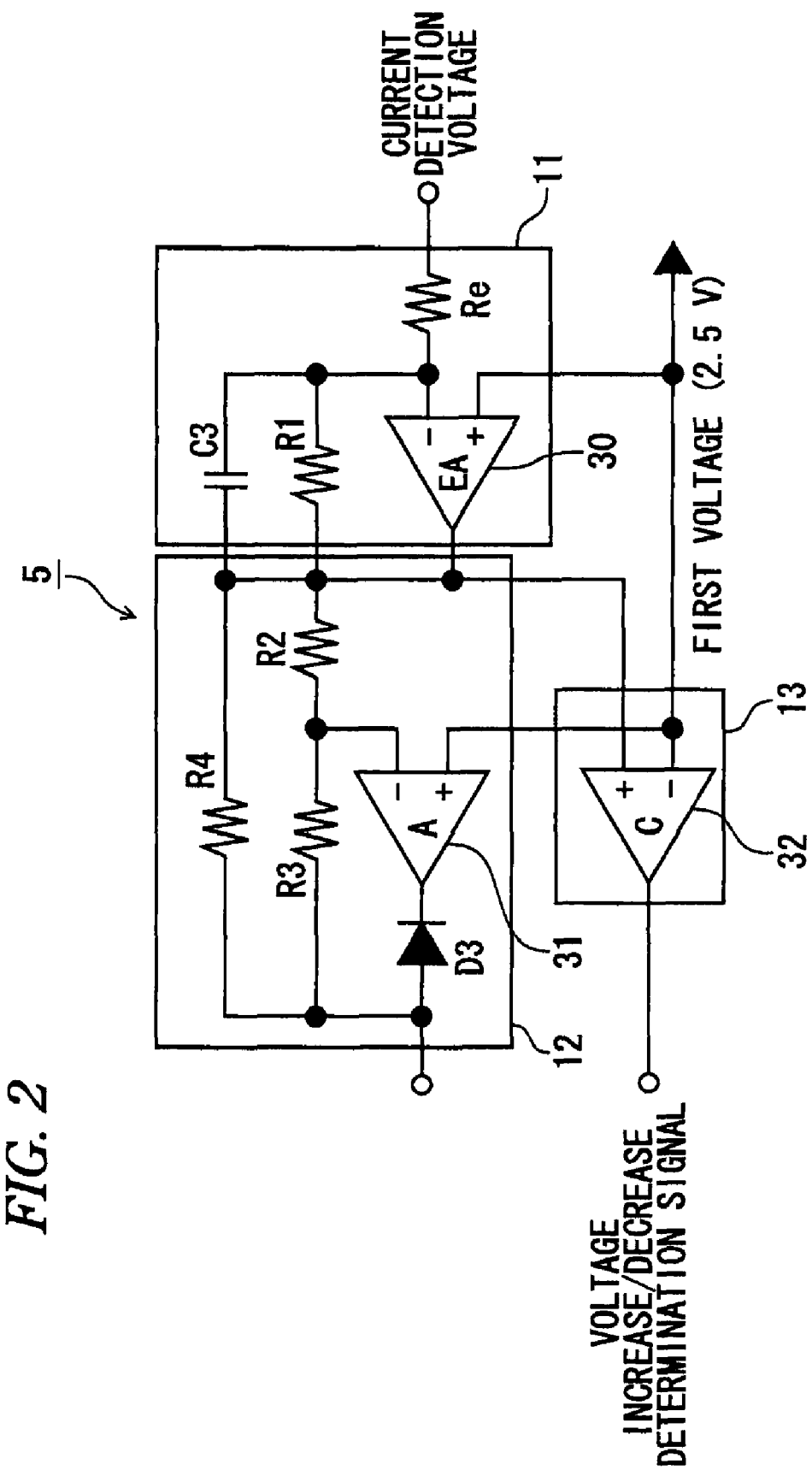
FIG. 2 illustrates a configuration of an error section.

In one aspect, an output voltage can be held constant relative to fluctuation of an input voltage.

In some implementations, a step-up/step-down DC-DC converter includes a voltage decrease section having a voltage decrease switch for providing a DC voltage from a DC power supply. A choke coil is connected to the voltage decrease switch. The voltage decrease section provides an output voltage lower than an input voltage. A voltage increase section has a voltage increase switch connected to the voltage decrease switch through the choke coil. The voltage increase section provides an output voltage higher than an input voltage. A control section controls turning on and off of the voltage decrease switch and the voltage increase switch.

The control section can include an error section having a comparison section for making a comparison between an output value from the voltage decrease section or the voltage increase section and a preset target value. The comparison section provides a comparison result. A computation circuit provides a voltage value indicating the same characteristic as a value resulting from adding (or subtracting) a difference between the voltage value of the comparison result and a first preset voltage value to (or from) a first voltage value as a computation output voltage. A triangular wave generation section generates a triangular wave. A drive pulse generation section generates a drive pulse for turning on and off the voltage decrease switch and the voltage increase switch in response to a comparison result between the computation output voltage and the triangular wave. When the voltage value of the computation output voltage does not exist between the first voltage value and the second preset voltage value, the drive pulse generation section causes (i) a voltage decrease mode to be set for maintaining the voltage increase switch off and turning on and off the voltage decrease switch or (ii) a voltage increase mode to be set for maintaining the voltage decrease switch on and turning on and off the voltage increase switch. When the voltage value of the computation output voltage exists between the first voltage value and a second voltage value, the drive pulse generation section causes a voltage increase and decrease mix mode to be set for selectively switching the on and off operation of the voltage decrease switch and the on and off operation of the voltage increase switch.

Therefore, if the voltage value of the computation output voltage provided by adding (or subtracting) the difference between the comparison result and the first voltage value to (or from) the first voltage value exists between the first voltage value and the second voltage value, then the on and off operation of the voltage decrease switch and the on and off operation of the voltage increase switch are selectively switched, and switch control to the voltage increase and decrease mix mode is performed.

In some implementations, one or more of the following advantages are present.

According to the configuration described above, when the input voltage and the output voltage are close to each other, the voltage decrease mode and the voltage increase mode are frequently switched. Thus, when the voltage decrease mode and the voltage increase mode are switched, the output voltage also can be averaged for output. Therefore, control can be performed so as to reliably hold the output voltage constant relative to fluctuation of the input voltage.

In some implementations, in the voltage increase and decrease mix mode, control is performed so that the percentage of selecting the on and off operation of the voltage decrease switch or the on and off operation of the voltage increase switch approaches one-half as the voltage value of the computation output voltage approaches the first voltage value. The comparison result is changed so as to approach the target value, and smooth feedback control is made possible.

In some implementations, the drive pulse generation section has a voltage transition circuit for presetting the first voltage value as an initial voltage value. The voltage transition circuit sets conversion output voltage values between the setup initial voltage value and the second voltage value. The voltage transition circuit also selects, in order, starting at the voltage value of the conversion output voltage values close to the initial voltage value until the conversion output voltage value reaches the voltage value of the computation output voltage. The voltage transition circuit makes the initial voltage value transit to the selected conversion output voltage value. In the voltage increase and decrease mix mode, when the conversion output voltage value reaches the voltage value of the computation output voltage, if the on and off operation of the voltage decrease switch is selected, the operation is switched to the on and off operation of the voltage increase switch and the conversion output voltage value is reset to the initial voltage value. If the on and off operation of the voltage increase switch is selected, the operation is switched to the on and off operation of the voltage decrease switch and the conversion output voltage value is reset to the initial voltage value.

Therefore, occurrence of a discontinuous point of control when the voltage decrease mode and the voltage increase mode are switched can be prevented. The effect of variations in characteristics of circuit elements can be reduced.

In some implementations, if operation until the conversion output voltage value is reset to the initial voltage value since the conversion output voltage value lowered and the on and off operation of the voltage decrease switch or the on and off operation of the voltage increase switch was switched is one routine, the conversion output voltage value is varied for each routine.

Therefore, a change in the occurrence percentage of a voltage decrease drive pulse for turning on and off the voltage decrease switch and a voltage increase drive pulse for turning on and off the voltage increase switch can be made in a short period. Thus, ripple and vibration of output caused by resonance of the DC-DC converter can be prevented or reduced.

The disclosure also describes a vehicle lighting appliance that includes a step-up/step-down DC-DC converter. The drive current supplied to a light source can be held constant, and flicker of the light source can be prevented.

DETAILED DESCRIPTION

An embodiment of a step-up/step-down DC-DC converter is discussed below with reference to the accompanying drawings. The step-up/step-down DC-DC converter can be used as a drive circuit for driving a semiconductor light source forming a vehicle lighting appliance or the like.

As shown in FIG. 1, a step-up/step-down DC-DC converter 1 includes a voltage decrease section 2 for outputting output voltage Vout lower than input voltage Vin, a voltage decrease section 2 for outputting output voltage Vout lower than input voltage Vin, a voltage increase section 3 for outputting the output voltage Vout higher than the input voltage Vin, and a control section 4 for controlling the voltage decrease section 2 and the voltage increase section 3. The step-up/step-down DC-DC converter 1 functions as a current supply means for supplying drive current Iout to LEDs (Light Emitting Diodes) 40, which serve as a semiconductor light source.

The illustrated voltage decrease section 2 includes a voltage decrease switch SW1, a capacitor C1, and a choke coil (inductor) L. The voltage decrease switch SW1 can be implemented as a switching element, for example, an NMOS transistor.

The voltage decrease switch SW1 (NMOS transistor) has a drain connected to an input terminal 8, a source grounded through a diode D1 and connected to one end of the choke coil L, and a gate connected to the control section 4. The voltage decrease switch SW1 is turned on/off as it receives a voltage decrease switch drive signal (on/off signal) from the control section 4.

The capacitor C1 has one end connected to the input terminal 8 and an opposite end grounded and connected to an input terminal 9.

The input terminal 8 is connected to a positive (+) terminal of a vehicle-installed battery (+B) of a DC power supply through a power switch SW3. The input terminal 9 is connected to a negative (−) terminal of the vehicle-installed battery.

The voltage increase section 3 includes the choke coil L common to the voltage decrease section 2, a voltage increase switch SW2, a capacitor C2 and a diode D2. The voltage increase switch SW2 can be implemented as a switching element, for example, an NMOS transistor.

The voltage decrease switch SW2 (NMOS transistor) has a drain connected to an opposite end of the choke coil L and an output terminal 27 through a diode D2 and a shunt resistor $R_{SH}$, a source grounded, and a gate connected to the control section 4. The voltage increase switch SW2 is turned on/off as it receives a voltage increase drive pulse (on/off signal) from the control section 4.

The capacitor C2 has one end connected to the diode D2 and an opposite end grounded and connected to an output terminal 28.

LEDs 40 are connected to the output terminals 27 and 28.

The shunt resistor $R_{SH}$ detects a drive current Tout flowing into the LEDs 40. A current detection amplifier 10 for amplifying the detected drive current Iout and providing it as a current detection voltage is connected to the shunt resistor $R_{SH}$.

The control section 4 includes an error section 5, a ramp wave generation section 6 as a triangular wave generation section, and a drive pulse generation section 7.

The error section 5 includes a comparison section 11, a computation circuit 12, and a voltage increase/decrease determination section 13.

The comparison section 11 includes an error amplifier 30, resistors Re and R1, and a capacitor C3. The computation circuit 12 includes an operational amplifier 31, a diode D3 and resistors R2 to R4. The voltage increase/decrease determination section 13 can be implemented as a comparator 32.

The capacitor C3 and the resistor R1 are connected between the negative input and output of the error amplifier 30. The error amplification factor of the error amplifier 30 is determined by the ratio between the resistors R1 and Re.

The current detection voltage amplified by the current detection amplifier 10 is provided to the negative input of the error amplifier 30 through the resistor Re, and a preset target output voltage (hereinafter called "target value") is provided to the positive input.

The detection voltage has a value as an output value from the voltage decrease section 2 and the voltage increase section 3. The target value is a preset value to obtain a desired output current Iout or output voltage Vout supplied to the LEDs 40.

The error amplifier 30 performs a comparison between the current detection voltage and the target value and sends the comparison result (comparison signal) provided by amplifying an error.

The comparison result is provided to the negative input of the operational amplifier 31, and a first preset value is provided to the positive input. The operational amplifier 31 subtracts the difference between the voltage value of the comparison result and the voltage value of the first voltage (hereinafter called "first voltage value") from the first voltage value and provides the voltage value of the subtraction result as a computation output voltage. The first voltage is a reference voltage for switching to either voltage decrease drive or voltage increase drive.

The comparison result is provided to the positive input of a comparator 32, and the first voltage value is provided to the negative input. If the voltage value of the comparison result is equal to or greater than the first voltage value, a high signal is output; if the voltage value of the comparison result is less than the first voltage value, a low signal is output.

Figure 3:
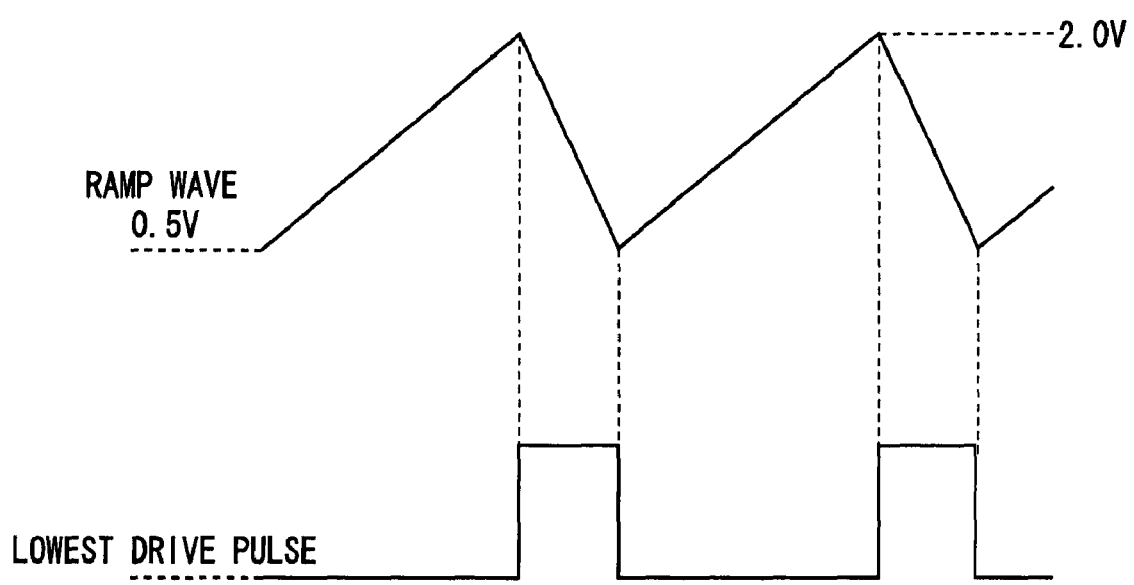
FIG. 3 illustrates a relationship between a ramp wave and a lowest drive pulse.
Figure 4:
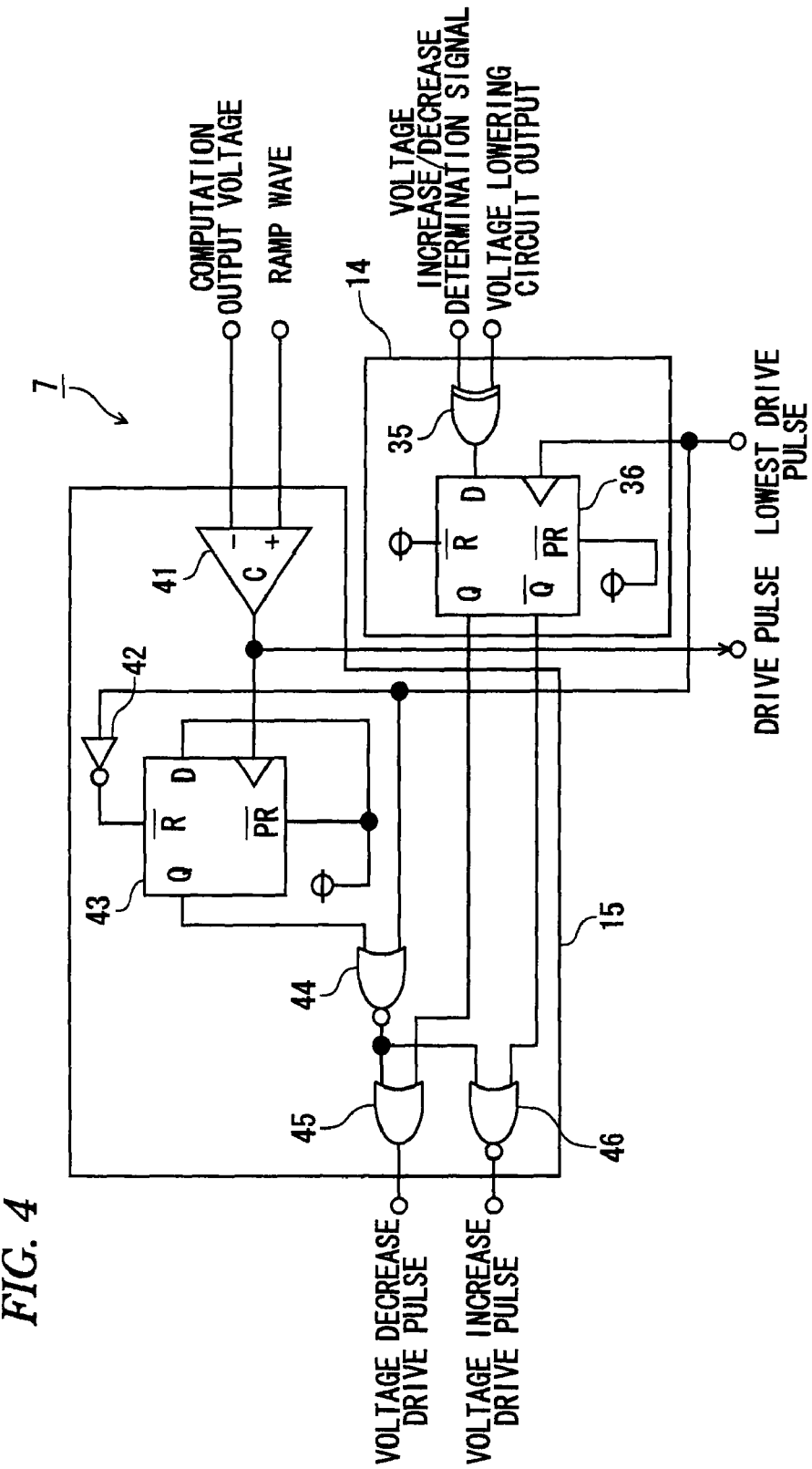
FIG. 4 illustrates a configuration of a drive pulse generation section.

In the illustrated example, the ramp wave generation section 6 includes a comparator, a resistor, and a capacitor and generates a ramp wave and a lowest drive pulse (see FIG. 3).

As shown in FIG. 3, the comparator has hysteresis of 2.0 V and 0.5 V, for example, the voltage value (second voltage value) of a peak voltage (second voltage) of the ramp wave. The ramp wave is generated by repeatedly discharging in which the voltage value decreases from 2.0 V to 0.5 V and then charging in which voltage value becomes 2.0 V. The lowest drive pulse is a pulse turned on during the time period over which the ramp wave decreases (see FIG. 3). The lowest drive pulse is described below in greater detail.

The drive pulse generation section 7 includes a switch section 14, a drive pulse generation circuit 15, and a voltage lowering circuit 16 which serves as a voltage transition circuit.

The switch section 14 includes an EXOR gate 35 and D flip-flop 36.

A voltage increase/decrease determination signal from the voltage increase/decrease determination section 13 is provided to one input of the EXOR gate 35 and voltage lowering circuit output signal from the voltage lowering circuit 16 is provided to the other input.

An output signal of the EXOR gate 35 is provided to a D terminal of the D flip-flop 36.

The drive pulse generation circuit 15 includes a comparator 41, a NOT gate 42, a D flip-flop 43, NOR gates 44, 46 and an OR gate 45.

Figure 5:
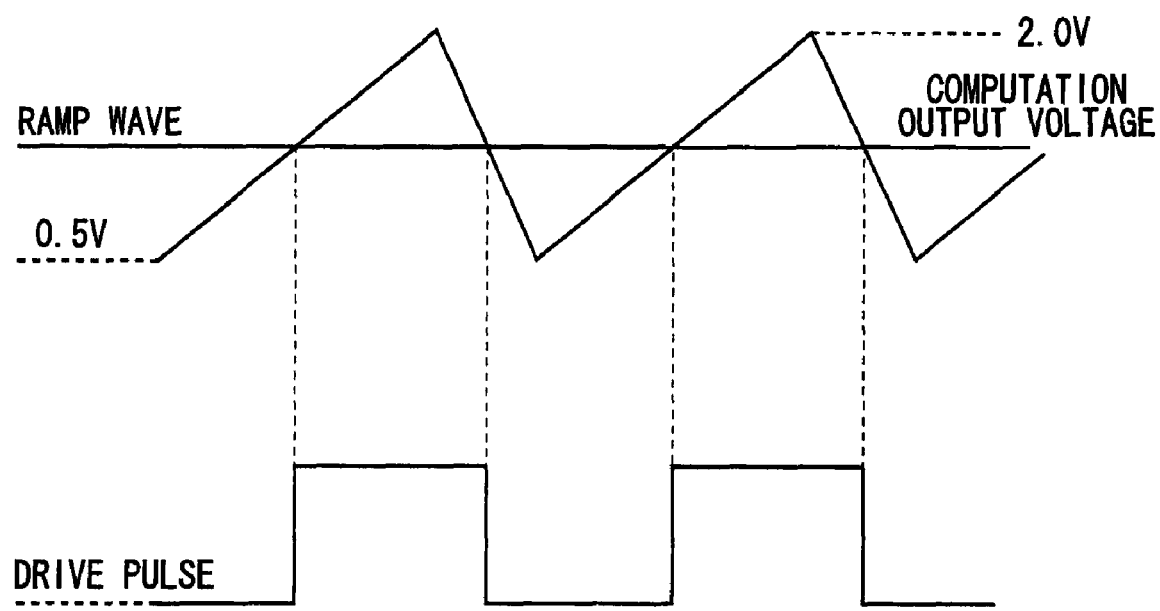
FIG. 5 is a drawing to describe generation of a drive pulse.

The computation output voltage is provided to the negative input of the comparator 41, and the ramp wave is provided to the positive input. If the voltage value of the computation output voltage is equal to or greater than the voltage value of the ramp wave, a low signal is output. If the voltage value of the computation output voltage is less than the voltage value of the ramp wave, a high signal is output (see FIG. 5).

The output signal of the comparator 41 is provided to a clock terminal of the D flip-flop 43 as a drive pulse (see FIG. 5) and is provided to the voltage lowering circuit 16.

Q output of the D flip-flop 43 is provided to one input of the NOR gate 44, and the lowest drive pulse input by the ramp wave generation section 6 is provided to the other input.

An output signal (NOR signal) of the NOR gate 44 is provided to one input of the OR gate 45, and Q output of the D flip-flop 36 is provided to the other input.

The NOR signal of the NOR gate 44 is provided to one input of the NOR gate 46, and Q bar output of the D flip-flop 36 is provided to the other input.

Figure 6:
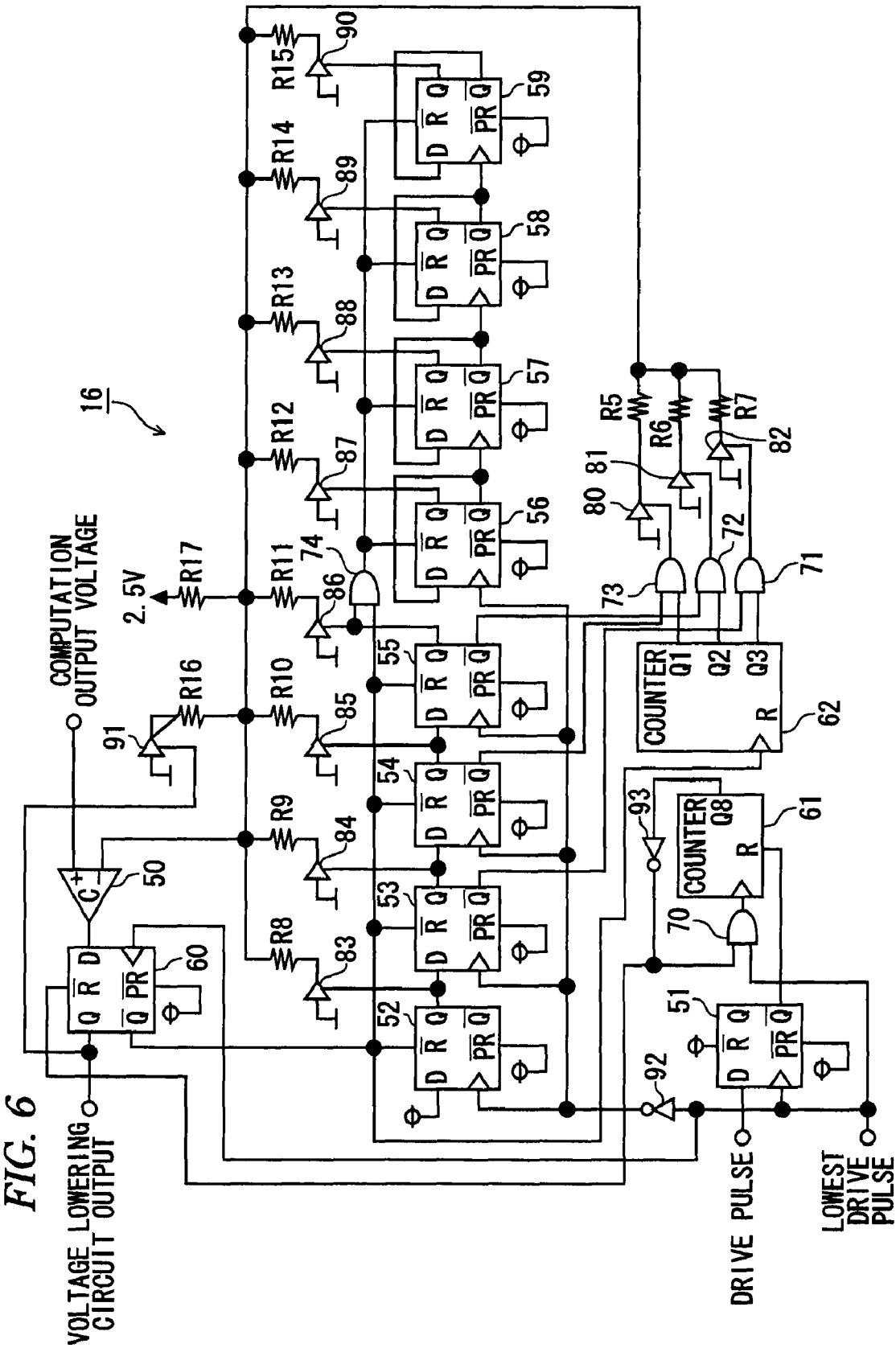
FIG. 6 illustrates a configuration of a voltage lowering circuit.

The voltage lowering circuit 16 includes a comparator 50, D flip-flops 51 to 60, counters 61, 62, resistors R5 to R17, AND gates 70 to 74, logic switches 80 to 91, and NOT gates 92, 93, as shown in FIG. 6.

The D flip-flops 52 to 55 function as a four-bit register, and the D flip-flops 56 to 59 function as a four-bit counter. The counter 62 functions as a three-bit counter.

The resistors R8 to R15 and the logic switches 83 to 90 function as a D/A (digital/analog) converter. In the D/A converter, an initial voltage value is preset as the first voltage value is made the initial voltage value and the logic switches 83 to 90 are turned on, whereby conversion output voltage values lower than the initial voltage value are set.

A drive pulse from the comparator 41 is provided to a D terminal of the D flip-flop 51, and the lowest drive pulse from the ramp wave generation section 6 is provided to a clock input. The lowest drive pulse is also provided to clock input of the D flip-flops 52 to 55 through the NOT gate 92.

The computation output voltage is provided to the positive input of the comparator 50, and an output voltage of the D/A converter (hereinafter called "D/A conversion output voltage") is provided to the negative input. If the voltage value of the computation output voltage is equal to or greater than the voltage value of the D/A conversion output voltage, a high signal is output. If the voltage value of the computation output voltage is less than the voltage value of the D/A conversion output voltage, a low signal is output.

An output signal of the comparator 50 is provided to a D terminal of the D flip-flop 60, the lowest drive pulse is provided to clock input, the voltage lowering circuit output is provided from Q output, and a reset signal is provided from Q bar output to reset terminals of the D flip-flops 51 to 55 and also is provided to reset terminals of the D flip-flops 56 to 59 through an AND gate 74.

Figure 7:
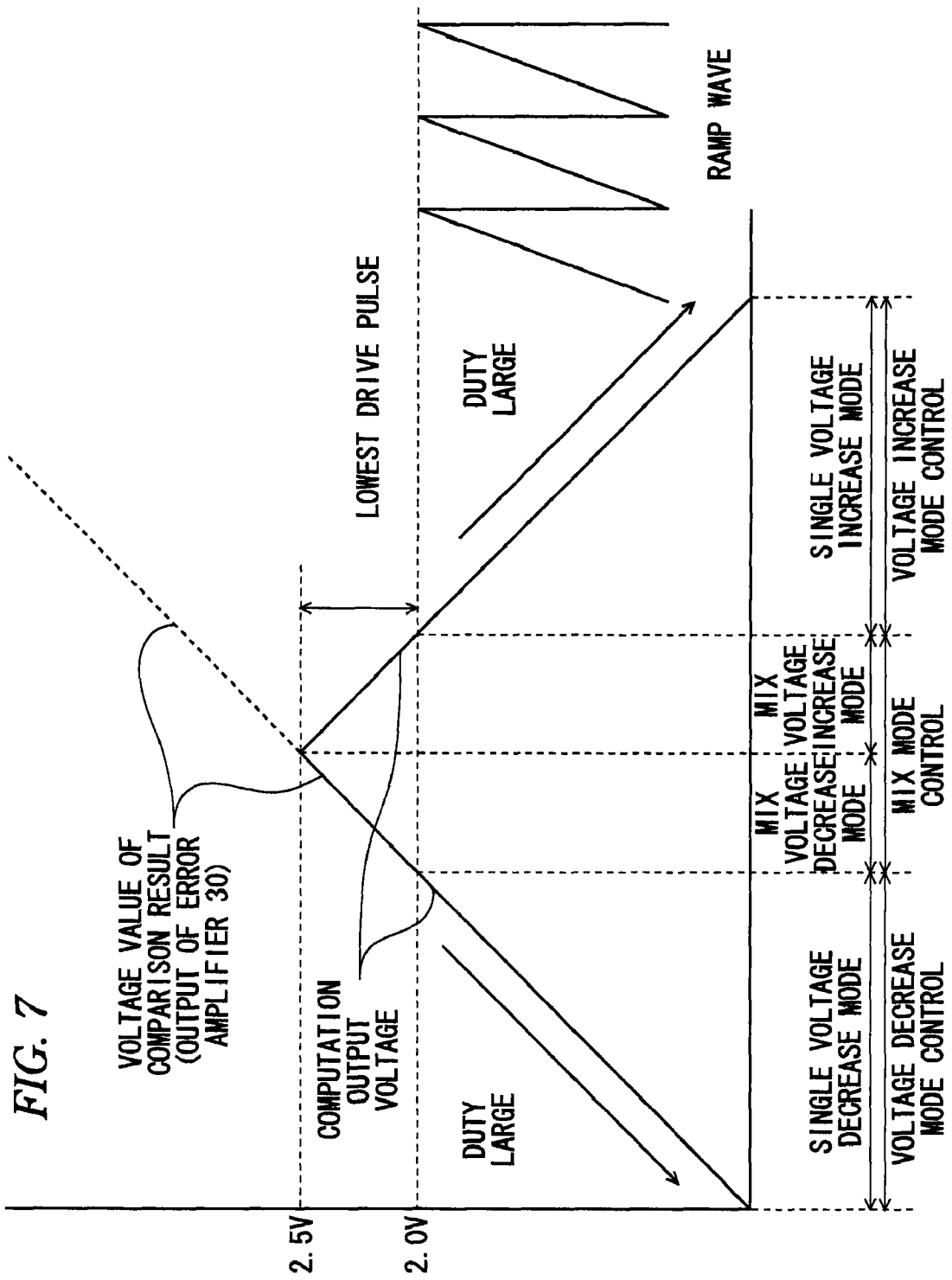
FIG. 7 is a graph to show changes in computation output voltage in voltage decrease mode control, mix mode control, and voltage increase mode control.
Figure 8:
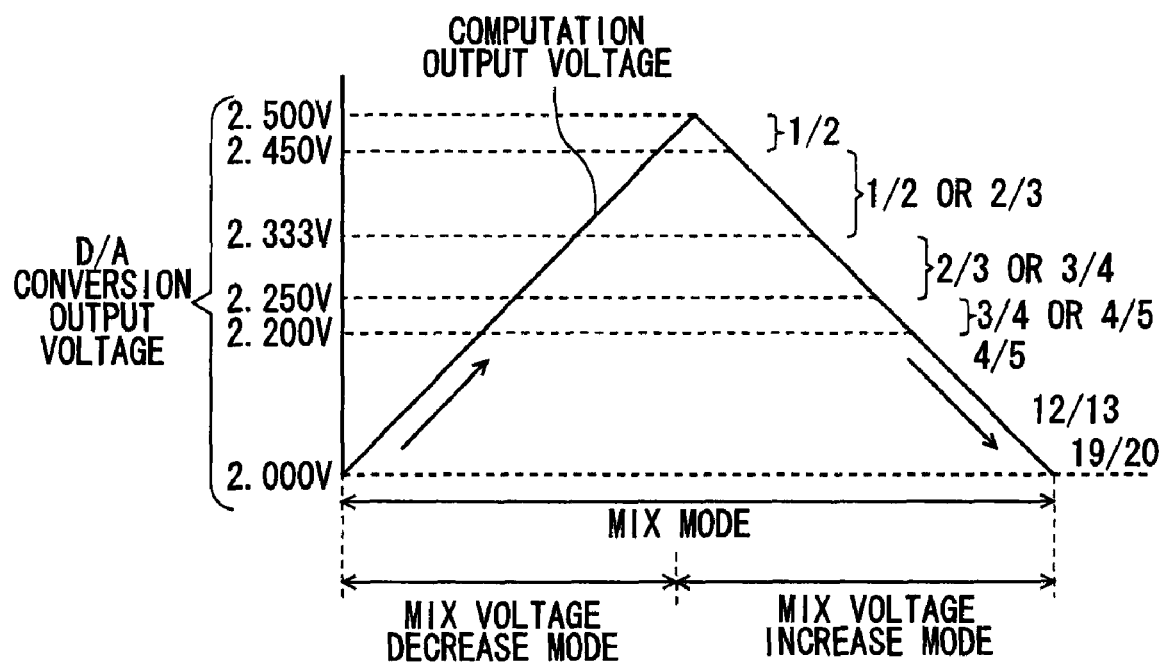
FIG. 8 shows the percentage of selecting a voltage decrease switch or a voltage increase switch in the mix mode control.

The operation of the step-up/step-down DC-DC converter 1 will be discussed below separately during control in a voltage decrease mode (hereinafter called "voltage decrease mode control"), control in a voltage increase and decrease mix mode of the voltage decrease mode and a voltage increase mode (hereinafter called "mix mode control"), and control in the voltage increase mode (hereinafter called "voltage increase mode control"). FIG. 7 shows change in the computation output voltage in the voltage decrease mode control, the mix mode control, and the voltage increase mode control. FIG. 8 shows the percentage of selecting the voltage decrease switch SW1 or the voltage increase switch SW2 in the mix mode control. In the following description, the "voltage decrease mode" in the voltage decrease mode control is called "single voltage decrease mode," the "voltage decrease mode" in the voltage increase and decrease mix mode is called "mix voltage decrease mode," the "voltage increase mode" in the voltage increase mode control is called "single voltage increase mode," and the "voltage increase mode" in the voltage increase and decrease mix mode is called "mix voltage increase mode."

First, the voltage decrease mode control is discussed.

When the power switch SW3 is turned on, current detection voltage corresponding to detection current from the current detection amplifier 10 is provided to the negative input of the error amplifier 30 of the comparison section 11 through the resistor Re. The error amplifier 30 compares the current detection voltage and the target value and outputs the comparison result. In the embodiment, the target value is the same value as the first voltage (2.5 V) provided to the negative input of the operational amplifier, but may be a different value.

The error amplifier 30 outputs the comparison result provided by amplifying the difference value between the detection voltage and the target value.

The operational amplifier 31 of the computation circuit 12 outputs the voltage value resulting from subtracting the difference between the voltage value of the comparison result and the first voltage value (2.5 V) from the first voltage value as computation output voltage. Therefore, in the single voltage decrease mode to the mix voltage decrease mode, the computation output voltage grows in value over time and in the mix voltage increase mode to the single voltage increase mode, the computation output voltage declines in value over time (see FIG. 7).

A computation circuit, in which the voltage value resulting from adding the difference between the voltage value of the comparison result and the first voltage value to the first voltage value is provided as the computation output voltage, may be adopted. In this case, in the single voltage decrease mode to the mix voltage decrease mode, the computation output voltage declines in value over time and in the mix voltage increase mode to the single voltage increase mode, the computation output voltage grows in value over time.

The computation circuit 12 can be a circuit in which a voltage value indicating the same characteristic as a value resulting from adding or subtracting the difference between the voltage value of the comparison result and the first preset voltage value to or from the first voltage value.

Since the voltage value of the comparison result is less than 2.5 V, the comparator 32 outputs a low signal as the voltage increase/decrease determination signal. Therefore, a low signal continues to be provided from the Q output of the D flip-flop 36 unless voltage lowering circuit output is provided as a high signal. As described below, voltage lowering circuit output is provided as a low signal as long as a drive pulse continues to be provided to the voltage lowering circuit 16. Thus, a low signal is provided from the Q output of the D flip-flop 36.

The voltage value of the computation output voltage provided to the negative input of the comparator 41 of the drive pulse generation section 7 is less than the second voltage (2.0 V). Therefore, the drive pulse (see FIG. 5), which becomes high when the voltage value of the ramp wave is equal to or greater than the voltage value of the computation output voltage, is provided to the clock input of the D flip-flop 43 and the D terminal of the D flip-flop 51 of the voltage lowering circuit 16 and is provided from the Q output.

A NOR signal from the NOR gate 44 is provided to the voltage decrease switch SW1 as a voltage decrease drive pulse.

The voltage decrease switch SW1 is turned on/off as it receives a voltage decrease drive pulse, and the voltage increase switch SW2 is maintained off.

Thus, when the voltage value of the computation output voltage does not exist between the first voltage value (2.5 V) and the second voltage value (2.0), the drive pulse generation section 7 sets the voltage decrease mode for maintaining the voltage increase switch SW2 off and turning on and off the voltage decrease switch SW1.

Next, the mix mode control is discussed.

When the voltage value of the computation output voltage increases and becomes equal to or greater than the second voltage value (2.0 V), a drive pulse is not provided from the comparator 41. Thus, the voltage lowering circuit 16 provides a high signal at a predetermined timing and in the mix voltage decrease mode, a voltage increase drive pulse is provided for switching to the mix voltage increase mode and in the mix voltage increase mode, a voltage decrease drive pulse is provided for switching to the mix voltage decrease mode.

Thus, when the voltage value of the computation output voltage exists between the first voltage value (2.5 V) and the second voltage value (2.0), the drive pulse generation section 7 sets the voltage increase and decrease mix mode by selectively switching the on and off operation of the voltage decrease switch SW1 and the on and off operation of the voltage increase switch SW2.

The operation of the voltage lowering circuit 16 is discussed below specifically:

In the single voltage decrease mode, a drive pulse is provided to the D terminal of the D flip-flop 51. Thus, Q8 output of the counter 61 becomes high, the voltage lowering circuit output becomes low, output of the EXOR gate 35 does not change, and a voltage increase drive pulse is not output.

When the voltage value of the computation output voltage becomes equal to or greater than 2.0 V and a drive pulse is not provided from the comparator 41, the lowest drive pulse is provided to clock input of the D flip-flop 52 and a four-bit shift register composed up of the D flip-flops 52 to 55 operates. In an example of the four-bit shift register in FIG. 6, the voltage value of D/A conversion output voltage provided to the negative input of the comparator 50 is reduced in the following order: 2.500 V, 2.450 V, 2.333 V, 2.250 V and 2.200 V. Further, the four-bit counter composed of the D flip-flops 56 to 59 operates, and the voltage value of the D/A conversion output voltage lowers to 2.000 V (see FIG. 8). If the voltage value of the D/A conversion output voltage becomes less than the voltage value of the computation output voltage, the four-bit shift register and the four-bit counter are reset and the voltage value of the D/A conversion output voltage is restored to 2.500 V of the initial voltage value.

When the voltage value of the computation output voltage is, for example, 2.480 V, the first lowest drive pulse is provided to the clock input of the D flip-flop 52, whereby the voltage value of the D/A conversion output voltage becomes 2.450 V and becomes less than the voltage value of the computation output voltage. Thus a voltage decrease drive pulse and a voltage increase drive pulse are alternately output for each clock.

In the mix voltage increase mode, when the voltage value of the computation output voltage is, for example, 2.400 V, the second lowest drive pulse is provided to clock input of the D flip-flop 52, whereby the voltage value of the D/A conversion output voltage becomes less than the voltage value of the computation output voltage. Thus after two voltage increase drive pulses are output, one voltage decrease drive pulse is output. That is, the voltage decrease drive pulse is output in the ratio of one to three clocks.

A change in the occurrence percentage of voltage decrease drive pulses and voltage increase drive pulses accompanying lowering of the D/A conversion output voltage in the voltage increase and decrease mix mode is discussed below with reference to FIG. 8. A graph of the computation output voltage in FIG. 8 is the same as the graph of the computation output voltage in the voltage increase and decrease mix mode in FIG. 7 and the occurrence percentage of voltage decrease drive pulses and voltage increase drive pulses is percentage when the voltage value of the D/A conversion output voltage is reduced in the following order: 2.500 V, 2.450 V, 2.333 V, 2.250 V and 2.200 V.

First, a change in the occurrence percentage of voltage decrease drive pulses and voltage increase drive pulses in the process in which the voltage value of the computation output voltage increases from 2.000 V to 2.500 V (mix voltage decrease mode in FIG. 8) is discussed.

The voltage value of the computation output voltage exists between 2.000 and 2.200 and as it approaches 2.200 V, the occurrence percentage of voltage decrease drive pulses and voltage increase drive pulses changes in the order of $19/20$, $18/19$, $17/18$, ..., $12/13$, $11/12$, ..., $4/5$.

The expression "the occurrence percentage in the mix voltage decrease mode is $19/20$," for example, is used to mean that 19 voltage decrease drive pulses occur in 20 clocks. Therefore, in the occurrence percentage in the mix voltage decrease mode, the expression of X (an integer of 1 or more)/Y (an integer of 1 or more) is used to mean that X voltage decrease drive pulses occur in Y clocks.

When the voltage value of the computation output voltage exists between 2.200 V and 2.250 V, the occurrence percentage of voltage decrease drive pulses and voltage increase drive pulses becomes $3/4$ or $4/5$.

When the voltage value of the computation output voltage exists between 2.250 V and 2.333 V, the occurrence percentage of voltage decrease drive pulses and voltage increase drive pulses becomes $2/3$ or $3/4$.

When the voltage value of the computation output voltage exists between 2.333 V and 2.450 V, the occurrence percentage of voltage decrease drive pulses and voltage increase drive pulses becomes $1/2$ (a voltage decrease drive pulse and a voltage increase drive pulse occur alternately) or $2/3$.

When the voltage value of the computation output voltage exists between 2.450 V and 2.500 V, the occurrence percentage of voltage decrease drive pulses and voltage increase drive pulses becomes $1/2$.

Next, a change in the occurrence percentage of voltage increase drive pulses and voltage decrease drive pulses in the process in which the voltage value of the computation output voltage decreases from 2.500 V to 2.000 V (mix voltage increase mode in FIG. 8) is discussed.

The expression "the occurrence percentage in the mix voltage increase mode is $2/3$," for example, is used to mean that two voltage increase drive pulses occur in three clocks. Therefore, in the occurrence percentage in the mix voltage increase mode, the expression of X (an integer of 1 or more)/Y (an integer of 1 or more) is used to mean that X voltage increase drive pulses occur in Y clocks.

When the voltage value of the computation output voltage exists between 2.500 V and 2.450 V, the occurrence percentage of voltage increase drive pulses and voltage decrease drive pulses becomes $1/2$.

When the voltage value of the computation output voltage exists between 2.450 V and 2.333 V, the occurrence percentage of voltage increase drive pulses and voltage decrease drive pulses becomes $1/2$ or $2/3$.

When the voltage value of the computation output voltage exists between 2.333 V and 2.250 V, the occurrence percentage of voltage increase drive pulses and voltage decrease drive pulses becomes $2/3$ or $3/4$.

When the voltage value of the computation output voltage exists between 2.250 V and 2.200 V, the occurrence percentage of voltage increase drive pulses and voltage decrease drive pulses becomes $3/4$ or $4/5$.

The voltage value of the computation output voltage exists between 2.200 and 2.000 and as it approaches 2.000 V, the occurrence percentage of voltage decrease drive pulses and voltage increase drive pulses changes in the order of $4/5$, $5/6$, $6/7$, ..., $12/13$, $13/14$, ..., $19/20$.

Switch drive of the voltage decrease switch SW1 and the voltage increase switch SW2 is controlled as described above, whereby the voltage value of the comparison result is changed so as to approach the target value and smooth feedback control is made possible.

In the example described above, the voltage value of the D/A conversion output voltage is lowered in the following order: 2.500 V, 2.450 V, 2.333 V, 2.250 V and 2.200 V. If the time period over which the voltage value of the D/A conversion output voltage lowers becomes less than the voltage value of the computation output voltage, and is reset to the initial value is one routine, the voltage value of the D/A conversion output voltage set in each of the D flip-flops making up the four-bit shift register and the four-bit counter may be changed for each routine.

The counter 62 (three-bit counter) and a D/A converter composed of the resistors R5 to R7 of output destination and operational amplifiers 80 to 82 are operated, and any of Q1 output to Q3 output is selected for each routine, whereby the voltage value of the D/A conversion output voltage is changed.

As for 2.450 V mentioned above, for example, 2.450 V is changed to 2.392 V to 2.421 V to 2.364 V to 2.436 V to 2.378 V to 2.407 V to 2.350 V to 2.450 V for each routine. As for 2.333 V mentioned above, for example, 2.333 V is changed to 2.283 V to 2.309 V to 2.257 V to 2.333 V for each routine. As for 2.250 V mentioned above, for example, 2.250 V is changed to 2.224 V to 2.250 V for each routine.

When the voltage value of the computation output voltage in the mix voltage increase mode is, for example, 2.400 V, the voltage value of the D/A conversion output voltage is 2.450 V in the first routine and thus two voltage increase drive pulses occur in three clocks. Since the voltage value of the D/A conversion output voltage is 2.392 V in the next routine, a voltage decrease drive pulse and a voltage increase drive pulse occur alternately. Since the voltage value of the D/A conversion output voltage is 2.421 V in the next routine, two voltage increase drive pulses occur in three clocks. Since the voltage value of the D/A conversion output voltage is 2.364 V in the next routine, a voltage decrease drive pulse and a voltage increase drive pulse occur alternately. Thus, the voltage value of the D/A conversion output voltage changes eight times and is restored to the former value and the operation is repeated. In this case, the probability that the occurrence percentage of voltage decrease drive pulses and voltage increase drive pulses will become $1/2$ becomes 50%.

As the voltage value of the computation output voltage approaches 2.500 V, the probability that the occurrence percentage of voltage decrease drive pulses and voltage increase drive pulses will become $1/2$ further rises. As the voltage value of the computation output voltage approaches 2.333 V, the probability that the occurrence percentage of voltage decrease drive pulses and voltage increase drive pulses will become $1/2$ lowers and approaches $2/3$.

When the occurrence percentage is between $1/2$ and $2/3$, 8 resolution is given, when the occurrence percentage is between $2/3$ and $3/4$, 4 resolution is given, and when the occurrence percentage is between $3/4$ and $4/5$, 2 resolution is given. As the numeric value of the resolution is larger, finer control is made possible.

As described above, the voltage value of the D/A conversion output voltage set in each D flip-flop is changed for each routine, whereby a change in the occurrence percentage of voltage decrease drive pulses and voltage increase drive pulses can be made in a short period, so that ripple and vibration of output caused by resonance of the DC-DC converter 1 can be prevented or reduced.

Next, the voltage increase mode control is discussed.

Since the voltage value of the comparison result is 2.500 V or more, the comparator 32 provides a high signal as the voltage increase/decrease determination signal.

Since the voltage value of the computation output voltage provided to the negative input of the comparator 41 of the drive pulse generation section 7 is less than the second voltage (2.0 V), the drive pulse which becomes high when the voltage value of the ramp wave is equal to or greater than the voltage value of the computation output voltage is input to the clock input of the D flip-flop 43 and the D terminal of the D flip-flop 51 of the voltage lowering circuit 16.

Since a low signal is output as voltage lowering circuit output as long as the drive pulse continues to be input to the voltage lowering circuit 16, the voltage decrease drive pulse becomes high. The output signal (NOR signal) of the NOR gate 44 is inverted and is provided to the voltage increase switch SW2 as a voltage increase drive pulse.

The voltage increase switch SW2 is turned on and off as it receives the voltage increase drive pulse, and the voltage decrease switch SW1 is maintained on.

Thus, when the voltage value of the computation output voltage does not exist between the first voltage value (2.5 V) and the second voltage value (2.0 V), the drive pulse generation section 7 sets the voltage increase mode for maintaining the voltage decrease switch SW1 on and turning on and off the voltage increase switch SW2.

As described above, when the input voltage Vin and the output voltage Vout are close to each other in value, the voltage decrease mode and the voltage increase mode frequently switch. Thus, when the voltage decrease mode and the voltage increase mode switch, the output voltage also can be averaged for output.

From the step-up/step-down DC-DC converter 1, the output voltage can be thus averaged for output, so that control can be performed so as to hold the output voltage Vout constant relative to fluctuation of the input voltage Vin when the voltage decrease mode and the voltage increase mode switch.

The control section 4 for executing the foregoing control when the input voltage Vin and the output voltage Vout are close to each other can be implemented as a logic circuit that does not significantly impact the semiconductor chip area, so that the scale of the circuit can be reduced.

Since either the voltage decrease switch SW1 or the voltage increase switch SW2 is selected in the drive period of PWM (pulse width modulation), electric efficiency improves and the circuit loss can be lessened.

Absolute accuracy of the setup first and second voltage values is not required; thus the effect of variations in circuit elements can be reduced.

Since the output voltage Vout (or drive current Iout) supplied to the LEDs 40 of a vehicle lighting appliance can be held constant, flicker of the LEDs 40 can be prevented.

In the embodiment described above, the output current feedback system is adopted by way of example, but an output voltage or output power feedback system also can be adopted.

A different embodiment of step-up/step-down DC-DC converter of the invention is discussed below with reference to FIG. 9.

This embodiment can be implemented by adding a non-drive circuit 100 to the configuration shown in FIG. 1.

The non-drive circuit 100 is a circuit for setting a state in which none of voltage decrease and voltage increase drive pulses are generated (no-drive state) when the number of occurrences of voltage decrease drive pulses (or voltage increase drive pulses) is large compared with the number of occurrences of voltage increase drive pulses (or voltage decrease drive pulses) in the mix mode. In the example in FIG. 8, the occurrence percentage of voltage decrease drive pulses and voltage increase drive pulses is $12/13$, $19/20$, etc.

Figure 9:
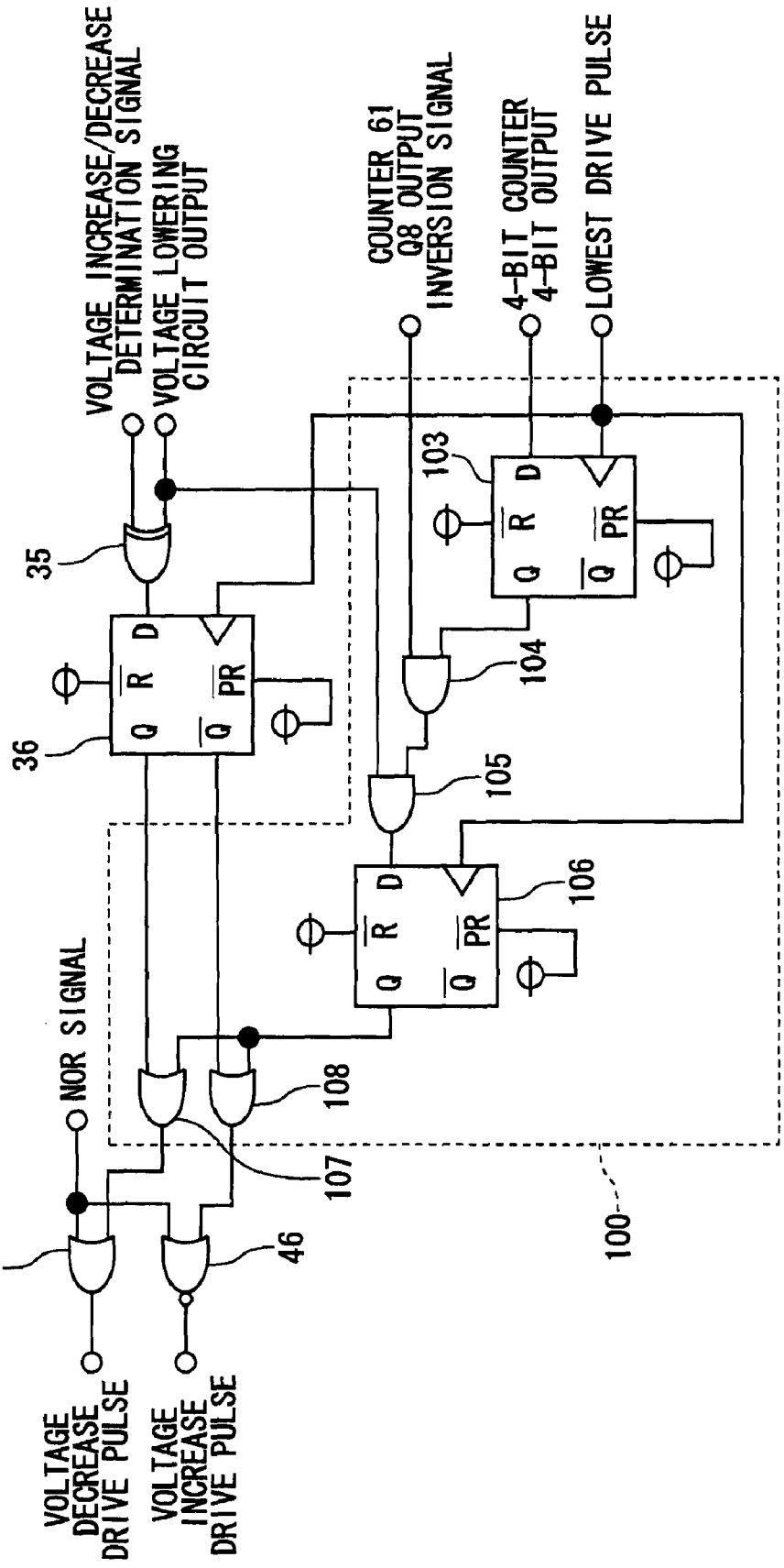
FIG. 9 illustrates a configuration of a step-up/step-down DC-DC converter according to another embodiment of the invention.

As shown in FIG. 9, the non-drive circuit 100 includes D flip-flops 103, 106, AND gates 104, 105 and OR gates 107, 108. The non-drive circuit 100 can be added to the drive pulse generation section 7.

When a Q8 output inversion signal of a counter 61 of a voltage lowering circuit 16 is high, it is a signal indicating the mix mode and enabling a non-drive state and is provided to the AND gate 104.

When four-bit output of a four-bit counter input to a D terminal of the D flip-flop 103 is high, it is a signal for setting the occurrence percentage of voltage decrease drive pulses and voltage increase drive pulses is $12/13$ to $19/20$.

When the occurrence percentage of voltage decrease drive pulses and voltage increase drive pulses is, for example, $12/13$ to $19/20$, the four-bit output and the Q8 output inversion signal become high and when voltage lowering output is high, a high signal is input to input of the OR gate 107 or 108. Thus, an inversion signal of a NOR signal is not output and the state becomes the non-drive state.

According to the configuration described above, ripple and vibration of output caused by resonance of a comparator can be reduced.

When the drive frequency of PWM is, for example, 2 M (Hz) and the occurrence percentage of voltage decrease drive pulses and voltage increase drive pulses is, for example, $12/13$ to $19/20$, if the state is set to the non-drive state, a non-drive frequency becomes 100 K (Hz) to 200 K (Hz) and falls below the frequency of radio wave used for example for a radio. Thus, the period (frequency) in the non-drive state does not adversely affect a circuit as radio noise.

The embodiments described above are only examples. Various modifications can be made without departing from the spirit and the scope of the invention. Other implementations are within the scope of the claims.

What is claimed is:

1. A step-up/step-down DC-DC converter comprising:
   a voltage decrease section having a voltage decrease switch for inputting a DC voltage from a DC power supply and a choke coil connected to the voltage decrease switch, the voltage decrease section for outputting an output voltage lower than an input voltage;
   a voltage increase section having a voltage increase switch connected to the voltage decrease switch through the choke coil, the voltage increase section for outputting an output voltage higher than an input voltage; and
   a control section for providing control to turn on and off the voltage decrease switch and the voltage increase switch,
   wherein the control section comprises:
      an error section having a comparison section for making a comparison between an output value from the voltage decrease section or the voltage increase section and a preset target value and outputting the comparison result, and a computation circuit for outputting a voltage value indicating the same characteristic as a value resulting from adding, or subtracting, a difference between the voltage value of the comparison result and a first preset voltage value to, or from, a first voltage value as a computation output voltage;

a triangular wave generation section for generating a triangular wave; and a drive pulse generation section for generating a drive pulse for turning on and off the voltage decrease switch and the voltage increase switch in response to the result of comparing the computation output voltage and the triangular wave, and wherein, when the voltage value of the computation output voltage does not exist between the first voltage value and the second preset voltage value, the drive pulse generation section provides control to set a voltage decrease mode for maintaining the voltage increase switch off and turning on and off the voltage decrease switch, or to set a voltage increase mode for maintaining the voltage decrease switch on and turning on and off the voltage increase switch, and when the voltage value of the computation output voltage exists between the first voltage value and a second voltage value, the drive pulse generation section provides control to set a voltage increase and decrease mix mode for selectively switching the on and off operation of the voltage decrease switch and the on and off operation of the voltage increase switch.

2. The step-up/step-down DC-DC converter as claimed in claim 1 wherein in the voltage increase and decrease mix mode, control is performed so that a percentage of selecting the on and off operation of the voltage decrease switch or the on and off operation of the voltage increase switch approaches one-half as the voltage value of the computation output voltage approaches the first voltage value.

3. The step-up/step-down DC-DC converter as claimed in claim 2 wherein the drive pulse generation section has a voltage transition circuit for presetting the first voltage value as an initial voltage value, setting a plurality of conversion output voltage values between the setup initial voltage value and the second voltage value, selecting the plurality of conversion output voltage values in sequence starting at the voltage value of the plurality of conversion output voltage values close to the initial voltage value and progressing to the conversion output voltage value reaches the voltage value of the computation output voltage, and making the initial voltage value transition to the selected conversion output voltage value, and wherein, in the voltage increase and decrease mix mode, when the conversion output voltage value reaches the voltage value of the computation output voltage, if the on and off operation of the voltage decrease switch is selected, the operation is switched to the on and off operation of the voltage increase switch and the conversion output voltage value is reset to the initial voltage value, and if the on and off operation of the voltage increase switch is selected, the operation is switched to the on and off operation of the voltage decrease switch and the conversion output voltage value is reset to the initial voltage value.

4. The step-up/step-down DC-DC converter as claimed in claim 3 wherein, if operation until the conversion output voltage value is reset to the initial voltage value since the conversion output voltage value lowered and the on and off operation of the voltage decrease switch or the on and off operation of the voltage increase switch was switched is one routine, the conversion output voltage value is varied for each routine.

5. A vehicle lighting appliance comprising a step-up/step-down DC-DC converter as claimed in claim 1.

* * * * *